United States Patent [19]

Lermann et al.

[11] 4,258,998

[45] Mar. 31, 1981

[54] STILL CAMERA WITH AN OBJECTIVE WHICH CAN BE RETRACTED INTO THE CAMERA HOUSING FOR DIMENSIONAL COMPACTNESS

[75] Inventors: Peter Lermann, Narring; Dieter Engelsmann, Unterhaching; Dieter Maas, Pöring; Reinhard Nicko, Munich, all of Fed. Rep. of Germany

[73] Assignee: AGFA-Gevaert, A.G., Leverkusen, Fed. Rep. of Germany

[21] Appl. No.: 94,662

[22] Filed: Nov. 15, 1979

[30] Foreign Application Priority Data

Nov. 17, 1978 [DE] Fed. Rep. of Germany ....... 2849893

[51] Int. Cl.³ .......................... G03B 1/12; G03B 13/02
[52] U.S. Cl. ...................................... 354/173; 354/195
[58] Field of Search ................... 354/212–214, 354/187, 190, 286, 25, 173, 170, 195, 288, 202

[56] References Cited

U.S. PATENT DOCUMENTS

| | | | |
|---|---|---|---|
| 1,847,531 | 3/1932 | Kesses | 354/190 X |
| 3,041,459 | 6/1962 | Greene | 354/25 X |
| 3,098,418 | 7/1963 | Reiher et al. | 354/173 |
| 3,126,803 | 3/1964 | Hintze | 354/173 |
| 3,616,738 | 11/1971 | Fujita | 354/187 |
| 3,913,113 | 10/1975 | Yamashita | 354/195 |
| 4,152,060 | 5/1979 | Specht | 354/195 |

*Primary Examiner*—Donald A. Griffin
*Attorney, Agent, or Firm*—Michael J. Striker

[57] ABSTRACT

A camera has an objective which can be moved from an extended, operative position to an inoperative position retracted into the camera housing for dimensional compactness. The objective is driven by a motor from one to the other of those two positions and moved by hand back in the other direction, or is motor driven in both directions. The motor employed is the film transport motor anyway present. The objective is coupled to and decoupled from the drive motor in dependence upon the setting of a manual selector, so that the objective not be driven at improper times, and is preferably coupled and decoupled in automatic response to the setting of a manual selector used to implement other camera functions, so that extension and/or retraction of the camera objective occur automatically as a logical incident to the other camera functions selected by the user.

21 Claims, 6 Drawing Figures

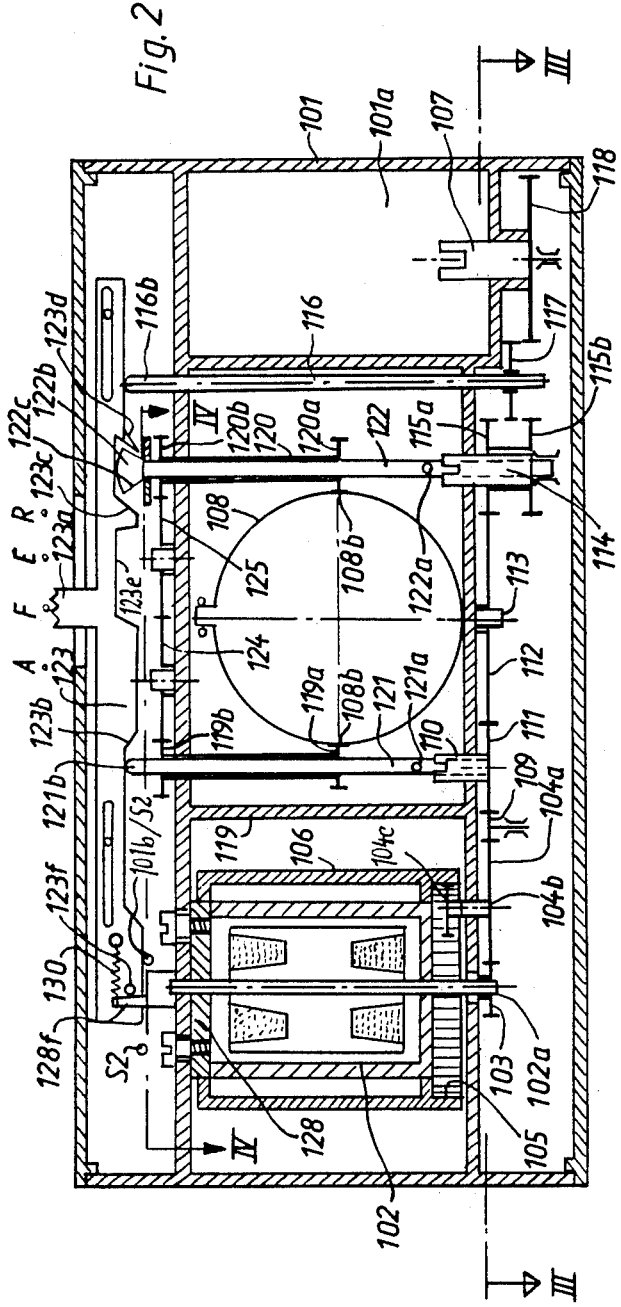
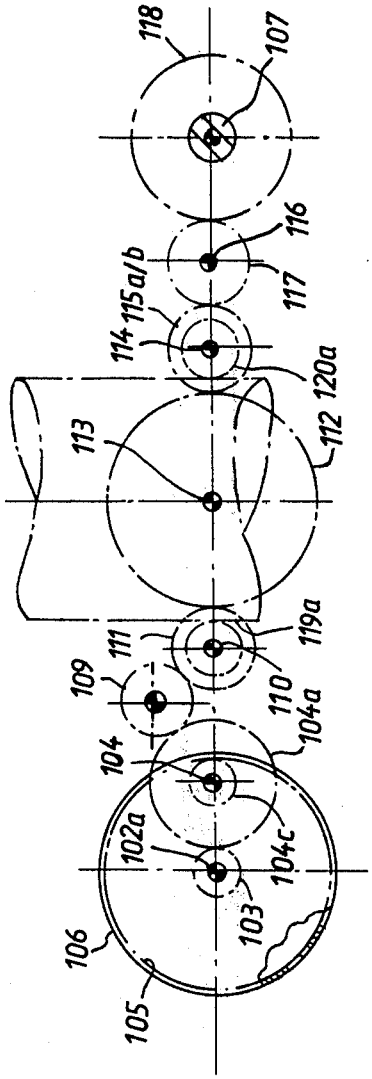

STILL CAMERA WITH AN OBJECTIVE WHICH CAN BE RETRACTED INTO THE CAMERA HOUSING FOR DIMENSIONAL COMPACTNESS

BACKGROUND OF THE INVENTION

The present invention concerns photographic still camera of the type having an objective which can be moved from an extended, operative position in which it projects out from the camera housing to a retracted, inoperative position in which it is retracted into the camera housing for dimensional compactness of the camera, e.g., when the camera is being carried about and not in use.

With known cameras of this type the objective is moved between extended and retracted position by hand, the extended position into which the objective is manually brought generally being its infinite-subject-distance focal setting.

SUMMARY OF THE INVENTION

It is a main concept of the invention to provide a motorized system which implements motorized movement of the objective at least from its retracted to its extended position, and preferably also motorized movement of the objective back into its retracted position.

It is a further concept of the invention to power the movement of the objective between its retracted and extended positions by utilizing a drive motor already contained in the camera for other purposes, most typically the camera's film transport motor, or the camera's shutter-resetting motor.

The invention also contemplates various interlocks and automatic features, which will be best understood from the detailed description of presently preferred embodiments, below.

BRIEF DESCRIPTION OF THE DRAWINGS

FIG. 2 depicts a second embodiment of the invention;

FIG. 3 is a section taken along line III—III of FIG. 2;

DESCRIPTION OF THE PREFERRED EMBODIMENTS

Figure 1:
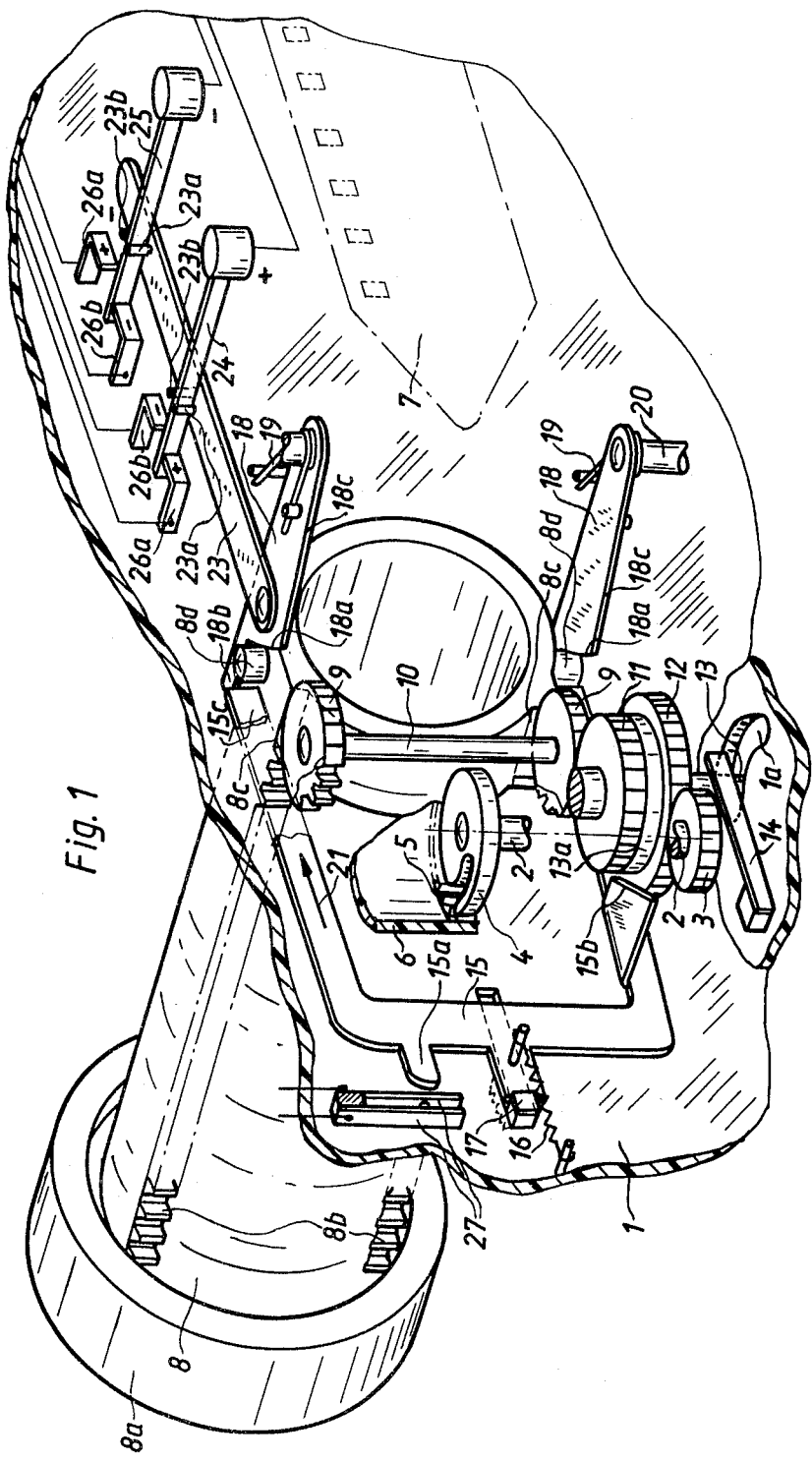
FIG. 1 is a perspective illustration of one embodiment of the present invention.
Figure 6:
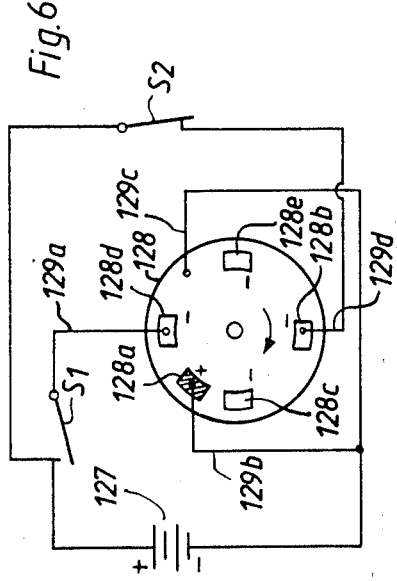
FIG. 6 depicts the switching mechanism of FIG. 5, in the setting which it assumes for causing the camera objective to be motor driven from extended, operative position to retracted, inoperative position.
Figure 5:
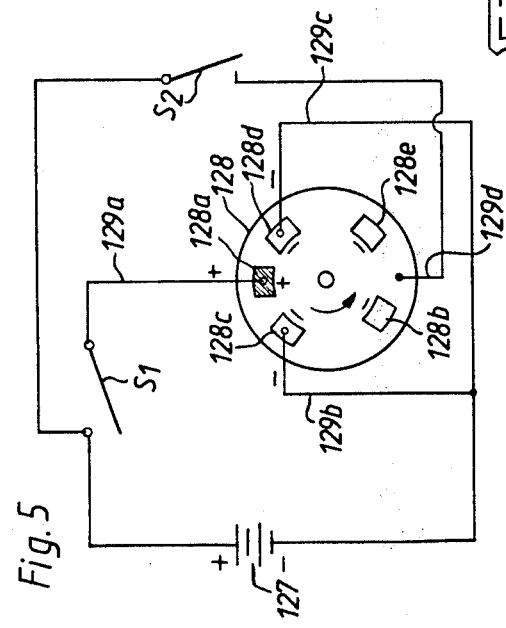
FIG. 5 depicts the rotary motor-direction switching mechanism of the embodiment of FIG. 2, in the setting which it assumes for forwards film transport.

In FIG. 1, numeral 1 denotes the housing of a still camera, the housing being shown mostly broken away. A non-illustrated reversible electric motor drives the shaft 2 of a pinion 3. Also mounted on shaft 2, for rotation therewith, is a springy pawl 4. Pawl 4 is so oriented as to cooperate with the ratchet teeth of a ring of ratchet teeth or ratchet wheel 5. Ratchet wheel 5 is connected with a film take-up spool 6, or else with a rotation-imparting member which can be brought into rotation-imparting engagement with the take-up member internal to a film cassette. When the electric drive motor operates in its normal direction, so as to effect take-up of the film 7 (which is to say, clockwise in FIG. 1), ratchet pawl 4 drives the ratchet wheel 5 and thereby effects film take-up. When the drive motor rotates in the opposite direction, the ratchet pawl 4 idles across the ratchet teeth of ratchet wheel 5.

The camera 1 is provided with an objective 8 which can be retracted into the camera housing, for the sake of small overall camera dimensions when the camera is not in use, and which can be extended out of the camera housing into operative position when the camera is to be used. FIG. 1 depicts objective 8 in its extended, operative position, which here coincides with its infinite-subject-distance focal setting. If the objective 8 is to be set to shorter subject-distance settings, then this can be effected, for example, by manually rotating focus adjuster ring 8, which rotation, in cooperation with non-illustrated means, serves to effect controlled partial retraction of the objective back into the camera. In the exemplary embodiment depicted in FIG. 1, the objective 8 is motor-driven from its inoperative setting (in which it is fully retracted in the camera housing 1) out to its fully extended setting, and then, when the camera is no longer to be used, is manually pushed back into the camera. In particularly, the (non-illustrated) drive motor which rotates shaft 2 and effects film transport is also used to drive the objective 8 out to its extended, operative position.

The outer surface of the objective housing is accordingly provided with two parallel rack portions 8b. As shown in FIG. 1, the rear ends of the two racks 8b, i.e., the portions of the racks which are located internal to the camera housing, include untoothed or recessed portions 8c. Each of the two racks 8b is engaged by a respective gear 9, both gears 9 being mounted on a shared shaft 10. One of the two gears 9 is in engagement with a gear 11. Gear 11 and a further gear 12 are mounted on a shared shaft 13. Shaft 13 is movably mounted in a slot 1a of the housing structure 1 and is biased by weak spring 14. Spring 14 urges 13 in a direction to bring the gear 12 into engagement with the gear 9. The orientation of slot 1a relative to a line connecting the gear shafts 2 and 13 is such that, when the gear 3 is driven in the film take-up direction (clockwise in FIG. 1), the interaction forces as between the gears 3 and 12 cause the gear 11 and its shaft 13 to be moved, against the force of biasing spring 14, out of engagement with gear 9. Conversely, when gear 3 is driven opposite the film take-up direction (i.e., is driven counterclockwise in FIG. 1), not only does the ratchet detent idle across the teeth of ratchet wheel 5, but additionally gear 11 is pressed into engagement with and drives gear 9. Accordingly, when gear 3 is driven opposite to the film take-up direction, the gears 12, 11 and 9 are driven, with gears 9, in particular, rotating counterclockwise. As a result, when the motor starts in this direction, the objective 8 via its rack portions 8b is driven out of the camera housing 1 into its illustrated, extended position, the gears 9 idling once they are reached by the untoothed or recessed portions 8c of the racks 8b. In principle, it would be possible to make use of only a single rack 8b and a single rack drive gear 9. However, it is preferred to use a pair of racks and a pair of drive gears, as shown, in order to prevent any tendency to impart to the objective 8 a downwards or upwards tilt.

In order to be able to switch over the transmission or the drive motor from its film-transport operation to its objective-drive action or so as to make possible pushing of the objective 8 into its retracted position in the camera housing, use is made in this embodiment of a slider 15 which extends and is mounted for movement in a direction perpendicular to the optical axis of objective 8. A spring 16 pulls slider 15 against an elastic stop member 17. Slider 15 is provided with a switch-activating projection 15a, an inclined cam portion 15b and at least one control arm portion 15c.

The rear end of the housing of objective 8 is provided with a blocking portion 8d. When objective 8 is in its fully extended position, the blocking edge 18a of a blocking lever 18 snaps into place behind blocking portions 8d under the action of a biasing spring 19, to prevent accidental pushing of the objective back into the camera housing. When the blocking lever 18 snaps into blocking position in this matter, it additionally switches off the drive motor. Here, too, use is preferably made of two blocking portions 8d, located at diametrally opposite portions of the objective housing, and two blocking levers 18 mounted on coaxial shafts 20. The ends 18b of the blocking levers 18 are located in the paths of motion of the control arms 15c. Accordingly, when the slider 15 moves towards the objective 8, i.e., rightwards in FIG. 1, the control arms 15c push the ends 18b of the blocking levers away from the blocking portions 8, the blocking levers 18d are swung away out of the path of motion of the blocking portions 8d, and the objective 8 can be manually pushed into its retracted position. The control edge 15b on slider 15 assures that the gears 9 do not interfere with the objective retraction and do not drive the ratchet pawl 4 in the film-transport direction. Slider 15 is moved in the direction of arrow 21, against the force of spring 16, by means of a (non-illustrated) manually shifted member located at the exterior of the camera housing, such member constituting an extension of or else being coupled to slider 15. As slider 15 is moved in direction 21, its cam portion 15b presses against an untoothed disk 13a on shaft 13, displacing the latter in housing slot 1a by such a distance that gear 11 is moved out of engagement with gear 9, so that as objective 8 is manually pushed into camera housing 1 the gears 9 idle, i.e., are passively driven by the racks 8b.

A control rod 23 is pivotally coupled, at 22, to the upper blocking lever 18 and carries two pairs of control pins 23a and 23b. Each pair of control pins 23a, 23b confines a respective spring contact 24, 25, contacts 23 and 25 being respectively connected to the positive and to the negative terminal of the (non-illustrated) electric drive motor. Two stationary contacts 26, both connected to the positive terminal of a (non-illustrated) battery, are each located to a respective first side of a respective one of the two contact springs 24, 25. Two stationary contacts 26b, both connected to the negative battery terminal, are each located to the respective other side of the respective contact spring 24 or 25.

As already stated, in FIG. 1 the objective 8 is shown in its extended, operative position. After user activation of a (conventional and therefore non-illustrated) shutter released mechanism, the camera's shutter performs an exposure operation, and upon completion of the exposure operation a film-transport operation should next occur. Accordingly, in any appropriate, conventional manner, one or more (non-illustrated) motor-connect switches connected in circuit with the drive motor are closed, to permit motor energization, either by manual activation or else in automatic response to exposure completion. As shown in FIG. 1, the positive terminal of the drive motor is presently connected, via spring contact 24 and its association contact 26a, to the positive battery terminal, whereas the negative drive motor terminal is presently connected, via spring contact 25 and its associate contact 26b, to the negative battery terminal. Accordingly, the motor is energized for rotation in the direction required for film take-up operation, and gear 3 is rotated clockwise. The initiation and termination of motor energization can be controlled by any of the various switching and/or transmission expedients so well known in the art, and accordingly, it is only the motor-direction control switches which are depicted in FIG. 1.

Thus far, it has been explained how, with the objective 8 in extended position, a film transport operation is permitted to occur, and also how the objective 8 can be pushed by hand from its extended position back into its retracted position. Next to be explained is how the objective 8 is driven out from its retracted position to its illustrated, extended position. Slider 15 is moved by spring 16 opposite to direction 21 and compresses the elastic stop member 17. Because the objective 8 is in retracted position, the edges 18c of the blocking levers 18 bear against the blocking portions 8d of the objective housing; accordingly, blocking levers 18 do not interfere with movement of the objective to extended position. With objective 8 not in fully extended position and levers 18 accordingly displaced somewhat clockwise, control slide 23 is displaced in the direction of arrow 21 by a distance such that the positive-terminal contact 24 of the motor engages the associated negative-battery-terminal contact 26b, whereas the negative-terminal contact 25 of the motor engages the associated positive-battery-terminal contact 26a, i.e., the settings opposite to those shown for film transport in FIG. 1. When slider 15 is moved leftwards and compresses the elastic stop member 17, the second (and illustrated one) of the aforementioned two, parallel-connected motor-energization switches, i.e., switch 27, closes, so that the motor begin to turn and drive gear 3 counterclockwise. For this rotary direction, gear train 3, 12, 11, 9 is engaged, and accordingly the gears 9 rotate counterclockwise and drive the objective 8, via the racks 8b, into the illustrated extended position thereof. At the end of the extension movement of objective 8, the blocking levers 18 snap into place, with their blocking edges 18c snapping into position behind the blocking portions 8d of the objective housing, thereafter preventing accidental depression or retraction of the objective 8. Also, the control slide 23 is moved opposite to direction 21, to set the motor direction back to the film-transport mode. The mode of operation causing the objective to move out to extended position has now been completed. When the user lets go of slider 15, the elastic stop member 17, acting as a compression spring, pushes the slider 15 a small distance rightward, i.e., back to the illustrated setting of slider 15. If the motor does not come to an immediate stop as a result of the aforementioned direction-reversing action, the gears 9 can in any event idle in the untoothed portions 8c of the racks 8b.

Accordingly, in the embodiment of FIG. 1, an electric film-transport motor drives the film take-up spool, or the like, through the intermediary of a coupling which transmits rotation to the take-up spool only when rotated in one of two rotary directions, and when the direction of the drive motor is reversed no film-transport action occurs and instead the camera's objective is driven out from retracted to extended position.

FIGS. 2–6 depict a modification of the FIG. 1 embodiment, in which the drive-motor rotation direction opposite to that which effects forward film transport is utilized to drive the camera objective out to extended position but additionally to pull the camera objective back into retracted position and also to effect reverse or rewind transport of the film, especially in the case of miniature film in type-135 cartridges.

In FIGS. 2-6, the camera housing is denoted by 101, the reversible electric drive motor by 102, the motor output shaft by 102a and the motor drive pinion by 103. Pinion 103 is engaged by a gear 104a mounted on a shaft 104. Gear 104a is coupled to a film-transport gear 104c via a coupling 104b operative for transmitting rotation from pinion gear 104a to gear 104c only when drive pinion 103 is rotating in the direction associated with forward film transport. The film-transport gear 104c meshes with internal toothing 105 provided on a film take-up spool 106. The drive motor 102 is located interiorly of and coaxial with the film take-up spool 106. If the motor 102 turns counterclockwise, then the gears 104c and 105 and accordingly the take-up spool 106 turn clockwise, as a result of which the (non-illustrated) film will be pulled from the (non-illustrated) cartridge in film-supply compartment 101a and be taken up on the take-up spool 106. To avoid pictorial complexity, there are omitted from these Figures the film-perforation-engaging sprocket wheel, the step-by-step transmission between motor 102 and such sprocket wheel, and the control means employed to activate the camera's shutter mechanism and to initiate and terminate the forward film transport operation, inasmuch as such mechanisms come in a variety of types all exceedingly familiar to persons skilled in the art. However, the rewind shaft 107, which engages the (non-illustrated) film spool internal to the (non-illustrated) film-supply cartridge, is shown.

In FIGS. 2-6, as in FIG. 1, in order to reduce the overall dimensions of the camera when it is not in use its objective can be retracted into the camera housing 101 and extended out to operative position when the camera is actually to be used. The housing of objective 108 is provided with two diametrally oppositely located rack portions 108b, located on a diameter of the objective housing which extends generally parallel to the film-transport direction.

The gear transmission for the motorized movement of the camera objective will now be described. Gear 104a meshes with a gear 109, and the latter meshes with a gear 111 provided on a shaft 110. Gear 111 engages a gear 112 mounted on a shaft 113, the rotation axis of gear 112 intersecting the optical axis of the objective 108, perpendicular thereto as shown. Gear 112 in turn meshes with a gear 115a provided on a shaft 114. Shaft 114 also carries a further gear 115b, identical to gear 115a but axially spaced a small distance from the latter. A gear shaft 106, mounted shiftable in the direction parallel to the longitudinal axis of take-up spool 106, carries a further gear 117 so arranged that normally, i.e., during motor-powered forwards film transport, it is located axially intermediate the two gears 115a, 115b; however, if gear shaft 106 is displaced downwardly, then gear 117 comes into mesh with gear 115b, and also into mesh with a further gear 118 which is located at about the level of gear 115b and is connected to the film rewind shaft 107, thereby establishing a complete power train from motor 102, 103 to the rewind shaft 107. The gear power train 103-118 is so designed that, when the motor 102 turns in the direction (clockwise) opposite to that for forward film transport, gear 118 turns counterclockwise, i.e., so as to drive the spool internal to a film-supply cartridge in the forward film-transport direction, with the shafts 110, 114 likewise turning counterclockwise. The power train 103, 118 can, as shown, be located beneath the objective 108 and the motor 102.

The hollow shafts 119, 120 are located to either side of objective 108 and extend parallel to the longitudinal axis of the film take-up spool 106. The hollow shafts 119, 120 carry respective pairs of identical gear 119a, 119b and 120a, 120b. The gears 119a and 120a mesh with respective ones of the two racks 108b. The hollow shafts 119, 120 accommodate respective coupling shafts 121 and 122. Each of coupling shafts 121, 122 is axially shiftable within the interior of the respective hollow shaft 119, 120 but is not rotatable relative to the respective hollow shaft. The ends of the coupling shafts 121, 122 which face towards the shafts 110, 114 are configured as coaxial shaft couplings 121a and 122a. The ends 121b, 122b of these coupling shafts located above the objective 108, and also the shiftable shaft 116, are passed by (non-illustrated) biasing springs upwards against a manual slider 123. Located intermediate the two, identical gears 119, 120b there are disposed two gears 124, 125, identical to each other, interengaged such that the two gears 119b, 120b rotate in opposite respective directions. The gear train 119b, 124, 125, 120b is advantageously disposed above the objective 108, in the manner shown.

If drive motor 102 is set for rotation in such a direction that pinion 103 turns clockwise, and if the shaft 121 is in downwardly displaced setting and therefore in engagement with shaft 110, then in the illustrated embodiment the other coupling shaft 122 is disengaged from shaft 114, and the shaft 116 is in elevated setting so that gear 117 is disengaged from the gears 115b and 118. If then the motor commences to turn, then due to the one-way coupling 104b no film-transport action occurs, and instead the gears 111, 119a, 119b turn counterclockwise and accordingly the gear 120a clockwise. As a result, the objective 108 is driven out to the extended position shown in FIG. 4 via the rack portions 108b. In the other mode of operation, shaft 121 is disengaged as is also gear 117, and shaft 122 is engaged with shaft 114, shaft 122 being in its downwardly displaced position. As a result, gear 120a turns counterclockwise and gear 119a turns clockwise, and the objective 108 is then driven back into its retracted position retracted into the camera 1. In a third mode of operation, shaft 116 is in its downwardly displaced position, both the coupling shafts 121, 122 are in decoupled condition, and clockwise rotation of the motor drive pinion 103 effects reverse or rewind film transport via the gear 118.

In order to be able to select from among these modes of operation, some sort of control means must be provided, and preferably including a manual selector member moved by the user of the camera. In the illustrated embodiment, the control means employed comprises the aforementioned slider 123, the slider 123 having an arm 123a which projects out to the exterior of the camera to constitute the manual selector member. In the illustrated embodiment, the slider 123 is guided for sliding motion parallel to the film transport direction, by means of, for example, the illustrated pin-and-slot connections (no reference numeral). In FIG. 2, slider 123 is in its setting F, for film transport, and the upper shaft ends 121b, 122b and 116b are located in recesses of the slider 123, so that these shafts will not be pressed down into their downwardly displaced settings. As shown in FIG. 2, to the right of the upper shaft end 121b the slider 123 has a cam portion 123b with slanted ends, so that when slider 123 is shifted leftward into its setting A, the coupling shaft 121 come into engagement with the shaft 110, in which case the objective 108 is driven out to extended position. In FIG. 2, to the left of upper shaft end 122b the slider 123 has a cam portion 123c with a similar slanted end portion; the cam portion 123c is bent in such a configuration that it does not cooperate with upper shaft end 122b but instead only with upper shaft end 116b. Shown to the right of shaft end 122b is a further inclined camming portion 123d on slider 123; camming portion 123d is located a certain distance out of the way of shaft 116, so that it does not cooperate with shaft 116 but instead cooperates only with shaft end 122b. To the left of camming portion 123c is another recess 123e. If slider 123 is shifted rightwards from its film-transport setting F to its setting E, then shafts 121 and 116 are in their decoupled settings, whereas the camming portion 123c presses the shaft 122 into its setting engaged with the shaft 114; accordingly, in setting E of slider 123, the objective is pulled inwards into its retracted position. If slider 123 is shifted further rightward to setting R, then the upper shaft end 122 is located in recess 123e, whereas the camming portion 123d presses the shaft 116 downwards into its setting for a film-rewind operation.

In addition to the implementing operations described above, it is necessary that motor direction be controlled, here in dependence upon the setting of slider 123, such that one motor direction is established for slider settings A, E and R and other motor direction for slider setting F. In order to achieve this in a simple way, in the illustrated embodiment the motor 102 is provided with a rotary switch 128 (see FIGS. 5 and 6) having a positive contact 128a, two negative contacts 128c and 128d each spaced 45° from the positive contact but located at opposite sides of the latter, and two further negative contacts 128b and 128e located to opposite sides of the positive contact and spaced therefrom by 125°. All these contacts 128b-128e are connected to the negative motor terminal and contact 128a to the positive motor terminal. Two switching circuits branch off from battery 217, one containing the switch S1 which serves to close the motor current path to effect forward film transport; this switch is, for example, in very familiar manner closed by an element of the camera's shutter mechanism upon completion of an exposure and then, for example, in equally familiar manner is reopened upon completion of a film-transport operation in response to the performance of one rotation of the camera's film-transport sprocket wheel. The second switching circuit which branches off from battery 127 contains the switch S2, which must be closed whenever the objective is to be driven out or retracted or when the film is to be rewound. The positive and negative terminals of battery 127 are connectable to various ones of these contacts 128a–128 via four stationary wipers 129a, 129b, 129c, 129d. The wipers 129b and 129c are connected in common to the negative terminal of battery 127, and are spaced apart 90°. Wiper 129a is located intermediate the two wipers 129b, 129c and is connected to the positive battery terminal. Wiper 129d is connected to the positive battery terminal, and is located diametrically opposite to wiper 129a. Rotary switch 128 is provided with a tab 128f (see FIG. 2). A tension spring 130 is at one end connected to tab 128f and at its other end is connected to a pin on slider 123. Spring 130 pulls tab 128f against a pin 123f on slider 123. When slider 123 is in the forward film-transport setting F, the rotary switch 128 occupies the setting depicted in FIG. 5, the motor 102 turns counterclockwise. If slider 123 is shifted to setting A, the pin 123f on slider 123 carries rotary switch 128 with it, turning the latter 45° to the left to the setting shown in FIG. 6. When switch S2 closes (switch S1 is shown open, because it is assumed for simplicity that no shutter triggering action has occurred), objective 108 is driven out to extended position, because motor 102 now turns in the direction opposite that for forward film transport. If slider 123 is shifted to setting E, rotary switch 128 follows slider pin 123f until it reaches a stationary stop member 101b, whereupon the rotary switch 128 will have reached a setting which is symmetrical (relative to contact 129a) to the setting shown in FIG. 6. In this setting too, the motor 102 turns in the direction opposite that in which it turns for forward film transport, so that when switch S2 is closed the objective 108 is pulled in to retracted position. If slider 123 is shifted further rightward to film-rewind setting R, then due to stationary stop member 101b the setting of rotary switch 128 just described, is maintained, and when switch S2 is closed the film rewind operation commences.

The switch S2, for driving the objective in and out and for film rewind, could be closed by a separate manually operated switch-control element on the exterior of the camera. However, it is more advantageous that it be closed in automatic response to the slider 123 assuming the settings for driving the objective and for film rewind. To this end, use can be made of two switches S2, connected in parallel to each other, one being formed by the stop member 101b and the other being formed by a further such switch located symmetrically relative to the first, considered with respect to rotary switch 128. The two parallel switches S2 are shown in FIG. 2, and when slider 123 is shifted into either setting A or setting E, one or the other of these two switches is closed, as the case may be, the tab 128f serving as the shared moving contact for this double switch arrangement.

Figure 4:
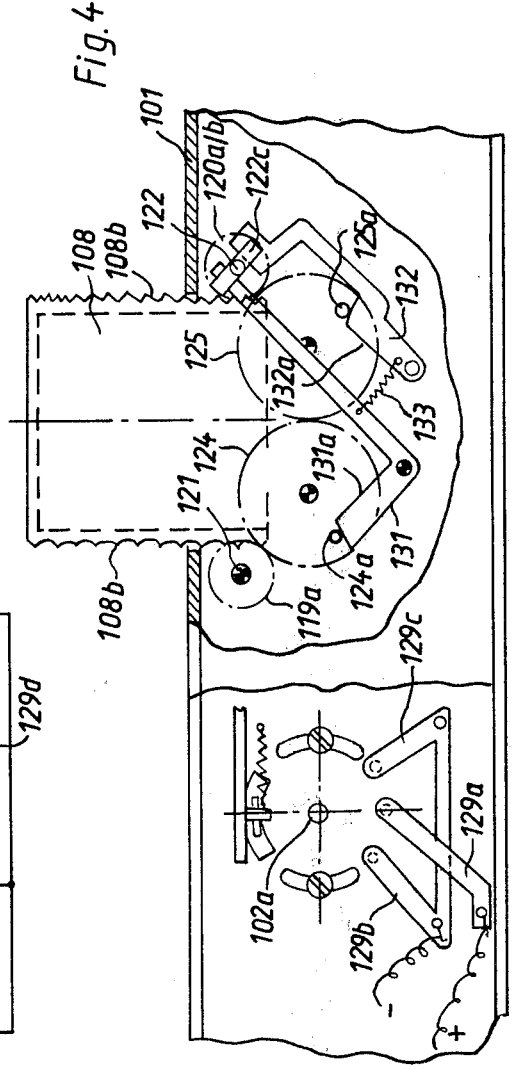
FIG. 4 is a section on line IV—IV of FIG. 2.

In order that the objective 108, when it has been brought out to its extended, operative position, be secured against unintentional pushing of it back into the camera housing, the upper end 122b of shaft 122 is provided, as shown, with a conical portion 122c, against which two blocking levers 131, 132 are pressed by a biasing spring 133 (see FIG. 4). When the objective 108 is in its extended position, the blocking levers 131, 132 are located behind respective pins 124a, 125a provided on respective ones of the two gears 124, 125, and thereby prevent unintentional retraction of the objective 108. When slider 123 is shifted to setting E, the conical portion 122c presses these blocking levers 131, 132 out of the path of motion of the pins 124a, 125a, so that the objective 108 can then be pulled into retracted position in the camera 101 by means of the gears 119a, 120a.

It will be understood that a great variety of modifications of the foregoing are within the scope of the invention, although not illustrated herein. Thus, for example, the construction shown in FIG. 2 could be modified by omission of the gear train 116, 117, 118 for the film-rewind mode of operation, in the event no such mode of operation is needed, e.g., in the case of type-110 or -126 cassette films whose cassettes have not only a film supply compartment but a film take-up compartment as well. In such event, the motor 102, unlike the case shown in FIG. 2, of course could not be located in the film take-up compartment of such cassette, but would instead need to be located at some other place, e.g., alongside the space which accommodates the cassette's take-up compartment. Likewise, instead of the rotary switch 128 described above, which implements motor-direction reversals in reliance upon the motor actually rotating to bring the moving contacts and stationary wipers of switch 128 into and out of engagement with each other, use could instead be made of a set of contacts forming three parallel switches, with the moving contact of such three switches being located in the path of motion of a respective one of the shiftable shafts 121, 122 and 116, so that these latter shafts close their associated switches as they respectively move into engagement with the shaft 110, the shaft 114 and the gear 115b. Similarly, in the construction shown in FIG. 1, the relationships could be reversed, with the objective 8 being motor-driven for its retracting movement, and being manually brought out to its extended, operative position, although such alternative is not presently preferred. As a further example of the various modifications which could be effected, instead of the racks provided on the objective housing or tube use could instead be made of an eccentric drive or a worm drive driven in two opposite directions by the camera's gear train.

It will be understood that each of the elements described above, or two or more together, may also find a useful application in other types of constructions and circuits differing from the types described above.

While the invention has been illustrated and described as embodied in preferred embodiments in which the extension and retraction of the camera objective is derived from the camera's film-transport motor, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In a photographic camera of the type having a camera housing and an objective including an objective housing and being mounted for movement between a retracted, inoperative position in which it is retracted into the camera housing for dimensional compactness of the camera and an extended, operative position in which it extends out from the camera, a drive mechanism for driving the objective from one to the other of said positions, the drive mechanism including an electric drive motor and transmission means coupled to the drive motor and to the objective and operative for transmitting motion to the latter from the former, the transmission means including two racks provided on the objective housing, two rack drive gears which engage respective ones of the two racks, and means transmitting motion from the drive motor to both rack drive gears simultaneously, the two racks and the two rack drive gears being so located and dimensioned that when the rack drive gears are driven by the drive motor they apply balanced drive forces to the objective housing.

2. In a photographic camera of the type having a camera housing and an objective mounted for movement between a retracted, inoperative position in which it is retracted into the camera housing for dimensional compactness of the camera and an extended, operative position in which it extends out from the camera, a drive mechanism for driving the objective from one to the other of said positions, the drive mechanism including a reversible rotary electric drive motor and transmission means coupled to the drive motor and to the objective and operative for transmitting motion to the latter from the former, the transmission means comprising at least one unidirectional transmission means operative for transmitting motion from the motor to the objective only when the motor rotates in one respective rotary direction, and the unidirectional transmission means comprising first and second gears, the first gear imparting motion to the objective, the second gear receiving motion from the drive motor, a further intermediate gear driven by the first gear and mounted for movement between a position engaging the second gear and a position not engaging the second gear and biasing means applying to the intermediate gear a biasing force biasing the intermediate gear towards said engaging position thereof, the direction in which the intermediate gear is movable between said positions thereof and the spatial locations of said first and second gears relative to said intermediate gear being such that when the first gear is driven by the drive motor in a first rotary direction the interaction force between said first and intermediate gears permits said biasing force to maintain said intermediate gear engaged with said second gear whereas when the first gear is driven by the drive motor in the opposite rotary direction the interaction force between the first and intermediate gears moves the intermediate gear out of engagement with the second gear against the action of said biasing force.

3. In a photographic camera of the type having a camera housing and an objective mounted for movement between a retracted, inoperative position in which it is retracted into the camera housing for dimensional compactness of the camera and an extended, operative position in which it extends out from the camera, a drive mechanism for driving the objective from one to the other of said positions, the drive mechanism including an electric drive motor and transmission means coupled to the drive motor and to the objective and operative for transmitting motion to the latter from the former, the transmission means including a disengageable coupling and manually activated means for engaging and disengaging the coupling.

4. The camera defined in claim 3, the objective being provided with an objective housing, the transmission means comprising at least one rack on the objective, the rack extending parallel to the optical axis of the objective, and means engaging the rack and driven by the motor.

5. In a photographic camera of the type having a camera housing and an objective including an objective housing and being mounted for movement between a retracted, inoperative position in which it is retracted into the camera housing for dimensional compactness of the camera and an extended, operative position in which it extends out from the camera, a drive mechanism for driving the objective from one to the other of said positions, the drive mechanism including an electric drive motor and transmission means coupled to the drive motor and to the objective and operative for transmitting motion to the latter from the former, the transmission means being capable of deriving from the motor either motion which drives the objective to extended position or to retracted position without a change of motor rotation direction and comprising two racks provided on the objective housing located diametrically opposite to each other, two rack drive gears meshing with respective ones of the two racks, two intermediate gears meshing with each other and each coupled to a respective one of the two rack drive gears, each of the two rack drive gears being provided on a respective gear shaft, two drive shafts to respective ones of which the two gear shafts can be coupled, two gears each provided on a respective one of the drive shafts and a further intermediate gear meshing with each of the two gears just mentioned, and manual means for causing one or the other of the two gear shafts to be coupled to the respective one of the two drive shafts.

6. The camera defined in claim 5, furthermore including two coupling shafts each of which is axially shiftable between a coupling position in which it couples a respective one of the gear shafts to the respective drive shaft and an uncoupling position in which it decouples the respective one of the gear shafts from the respective drive shaft, the manual means comprising a manually operated slider provided with cam portions operative for axially shifting the coupling shafts.

7. The camera defined in claim 6, the coupling shafts bearing against and being directly cammed by the cam portions.

8. In a photographic camera of the type having a camera housing an an objective mounted for movement between a retracted, inoperative position in which it is retracted into the camera housing for dimensional compactness of the camera and an extended, operative position in which it extends out from the camera, a drive mechanism for driving the objective from one to the other of said positions, the drive mechanism including an electric drive motor and transmission means coupled to the drive motor and to the objective and operative for transmitting motion to the latter from the former, the transmission means including disengageable coupling means coupling the drive motor to the objective.

9. The camera defined in claim 8, the camera including means guiding photographic film from a supply compartment to a take-up compartment and take-up means rotatable in a predetermined direction for effecting film take-up, the disengageable coupling means comprising means engageable with the objective and with the take-up means.

10. The camera defined in claim 8, the camera including means guiding photographic film from a supply compartment to a take-up compartment and rewind means rotatable in a predetermined direction for effecting film rewind, the disengageable coupling means comprising means engageable with the objective and with the rewind means.

11. The camera defined in claim 10, the disengageable coupling means including rewind-action coupling means operable for coupling the rewind means to the objective so that both the rewind means and the objective be simultaneously driven by the drive motor.

12. The camera defined in claim 10, the transmission including a gear driving the objective, the rewind-action coupling means comprising a gear mounted axially shiftable into and out of engagement with the gear driving the objective.

13. The camera defined in claim 12, the gear of the rewind-action coupling means being provided on a gear shaft, furthermore including a manually operated slider having a cam portion which cooperates with the gear shaft for axially shifting the latter.

14. In a photographic camera of the type having a camera housing an an objective mounted for movement between a retracted, inoperative position in which it is retracted into the camera housing for dimensiona compactness of the camera and an extended, operative position in which it extends out from the camera, a drive mechanism for driving the objective from one to the other of said positions, the drive mechanism including an electric drive motor and transmission means coupled to the drive motor and to the objective and operative for transmitting motion to the latter from the former, the transmission means including disengageable coupling means capable of coupling the drive motor to the objective irrespective of the rotary direction of the drive motor.

15. In a photographic camera of the type having a camera housing and an objective mounted for movement between a retracted, inoperative position in which it is retracted into the camera housing for dimensional compactness of the camera and an extended, operative position in which it extends out from the camera, a drive mechanism for driving the objective from one to the other of said positions, the drive mechanism including a reversible electric drive motor, and transmission means coupled to the drive motor and to the objective and operative for transmitting motion to the latter from the former; take-up means rotatable in a predetermined direction for effecting film take-up; and a one-way coupling coupling the drive motor to the take-up means to rotate the latter in said predetermined direction when the drive motor rotates in one respective direction, the transmission means including disengageable coupling means for coupling the drive motor to the objective at least when the drive motor rotates in the opposite direction.

16. The camera defined in claim 15, the transmission means furthermore including manual means for engaging and disengaging the disengageable coupling means, the drive motor being a reversible electric motor, and furthermore including electric motor-direction-reversing switches responsive to operation of said manual means.

17. In a photographic camera of the type having a camera housing and an objective mounted for movement between a retracted, inoperative position in which it is retracted into the camera housing for dimensional compactness of the camera and an extended, operative position in which it extends out from the camera, a drive mechanism for driving the objective from one to the other of said positions, the drive mechanism including an electric drive motor and transmission means coupled to the drive motor and to the objective and operative for transmitting motion to the latter from the former, the transmission means including disengageable coupling means for coupling the drive motor to the objective, the drive motor being a reversible electric motor, and furthermore including electric motor-direction-reversing switches responsive to operation of said manual means.

18. In a photographic camera of the type having a camera housing and an objective mounted for movement between a retracted, inoperative position in which it is retracted into the camera housing for dimensional compactness of the camera and an extended, operative position in which it extends out from the camera, a drive mechanism for driving the objective from one to the other of said positions, the drive mechanism including an electric drive motor and transmission means coupled to the drive motor and to the objective and operative for transmitting motion to the latter from the former; film transport means operative for effecting forward film transport under the drive action of the drive motor when the latter is operated in a first direction; and two motor-direction control switches of which one is closed to cause the motor to rotate in said first direction and the other to cause the motor to rotate in the opposite second direction, the camera being of the type in which the first direction control switch is closed upon the completion of an exposure to initiate film transport and then reopens after completion of film transport, the transmission means including disengageable coupling means coupling the objective to the drive motor and manual means operable for disengaging and engaging the coupling means, the second motor direction control switch closing in response to at least one predetermined setting of said manual means.

19. In a photographic camera of the type having a camera housing and an objective mounted for movement between a retracted, inoperative position in which it is retracted into the camera housing for dimensional compactness of the camera and an extended, operative position in which it extends out from the camera, a drive mechanism for driving the objective from one to the other of said positions, the drive mechanism including an electric drive motor and transmission means coupled to the drive motor and to the objective and operative for transmitting motion to the latter from the former; a manually operated element having one setting which enables the objective to be moved out to extended position and another setting which enables the objective to be moved inward into retracted position; and blocking means operative when the manually operated element is in said one setting for preventing unintentional retraction of the objective.

20. The camera defined in claim 19, the blocking means comprising a blocking element and biasing means causing the blocking element to move into a position preventing objective retraction when the manually operated element is in said one setting and means moving the blocking element out of said blocking position when the manually operated element is moved to the other setting thereof.

21. In a photographic camera of the type having a camera housing and an objective mounted for movement between a retracted, inoperative position in which it is retracted into the camera housing for dimensional compactness of the camera and an extended, operative position in which it extends out from the camera, a drive mechanism for driving the objective from one to the other of said positions, the drive mechanism including an electric drive motor and transmission means coupled to the drive motor and to the objective and operative for transmitting motion to the latter from the former; the transmission means including disengageable means disengageable for disengaging the objective from the drive motor; and manual means operable for disengaging the disengageable means and permitting the objective to be moved from one to the other of its positions by hand.

* * * * *